United States Patent [19]

Klabunde

[11] Patent Number: 4,716,205
[45] Date of Patent: Dec. 29, 1987

[54] NICKEL-CATALYZED POLYMERIZATION OF ETHYLENE

[75] Inventor: Ulrich Klabunde, West Chester, Pa.

[73] Assignee: E. I. Du Pont de Nemours and Company, Wilmington, Del.

[21] Appl. No.: 787,149

[22] Filed: Oct. 15, 1985

[51] Int. Cl.$^4$ ............................ C08F 4/80; C08F 10/02
[52] U.S. Cl. .................................. 526/115; 526/117; 526/118; 526/119; 526/121; 526/123; 526/124; 526/126; 526/127; 526/128; 526/135; 526/141; 526/142; 526/144; 526/147; 526/149; 526/154; 526/155; 526/160; 526/161; 526/171; 526/352
[58] Field of Search ............... 526/113, 117, 123, 126, 526/135, 147, 160, 161, 169.1, 171, 172, 115, 118, 119, 121, 124, 127, 128, 141, 142, 144, 149, 154, 155

[56] References Cited

U.S. PATENT DOCUMENTS

| | | |
|---|---|---|
| 3,454,538 | 7/1969 | Naarmann et al. ................. 526/171 |
| 3,497,488 | 2/1970 | Dawans et al. ...................... 526/135 |
| 3,635,937 | 1/1972 | Bauer et al. .......................... 526/171 |
| 3,637,636 | 1/1972 | Bauer et al. .......................... 526/123 |
| 3,644,564 | 2/1972 | Zwet et al. ........................... 526/135 |
| 3,686,159 | 8/1972 | Bauer et al. .......................... 526/123 |
| 3,759,889 | 9/1973 | Bauer et al. .......................... 526/171 |
| 3,763,197 | 10/1973 | Collier et al. ........................ 526/126 |
| 4,293,502 | 10/1981 | Beach et al. ......................... 260/439 |
| 4,293,727 | 10/1981 | Beach et al. ......................... 585/526 |
| 4,537,982 | 8/1985 | Starzewski et al. .................. 556/22 |

FOREIGN PATENT DOCUMENTS 3228865 8/1982 Fed. Rep. of Germany .
1578584 11/1980 United Kingdom .

OTHER PUBLICATIONS

J. Boor, "Ziegler–Natta Catalysts and Polymerizations", Chaps. 19, 20, Acad. Press (1979).
W. Keim et al., Angew. Chem. Int. Ed. Engl.: (a) 17, No. 6, 466 (1978); and (b) 22, No. 6, 503 (1983).
W. Keim, Ann. N.Y. Acad. Sci., 415, 191 (1983).

*Primary Examiner*—Edward J. Smith

[57] ABSTRACT

Preparation of polyethylene in the presence of selected nickel-containing catalysts.

7 Claims, No Drawings

NICKEL-CATALYZED POLYMERIZATION OF ETHYLENE

BACKGROUND OF THE INVENTION

Technical Field

This invention relates to the preparation of high molecular weight polyethylene in the presence of selected nickel-containing catalysts.

Background

Various nickel-containing compounds, usually in complexed form, are known in the art as catalysts for polymerizing ethylene to linear 1-olefin oligomers. Certain of these catalysts are reported to polymerize ethylene to high molecular weight polyethylene. For example, U.S. Pat. No. 3,686,159 discloses a phosphorane-complexed nickel catalyst which is reported to polymerize ethylene to a mixture of linear oligomers and linear, crystalline, high molecular weight polyethylene. This patent also discloses selected modifications wherein the catalysts are supported on solid substrates, including inorganic acidic oxides such as alumina or aluminosilicates. Keim, Angew. Chem., Int. Ed. Engl., 17, No. 6, 466 (1978) and 22, No. 6, 503 (1983) and Ann. N.Y. Acad. Sci., 415, 191 (1983), discloses a nickel-containing catalyst mixture which provides oligomers in toluene, but high molecular weight polymer in hexane under the same polymerizing conditions. Similar catalysts also provide high molecular weight polymer when equimolar amounts of (alpha-naphthyl)$_3$P are added to the catalyst.

U.S. Pat. Nos. 4,310,716; 4,382,153; 4,293,727; 4,301,318; 4,293,502; 4,507,247; 4,472,522; 4,503,279; 4,472,525; 4,503,280; 4,487,847; and 4,482,640 and European application Nos. 128,596 and 128,597 disclose nickel-containing ethylene oligomerization catalysts. There is no disclosure as to how these catalysts can be modified to provide high molecular polyethylene.

It has been discovered that certain selected nickel-based catalysts which are known for use in the preparation of ethylene oligomers can be modified to provide high molecular weight polyethylene. Also discovered and disclosed herein are certain novel nickel-containing catalysts and their use in the preparation of high molecular weight polyethylene. These novel nickel-containing catalysts are claimed in copending application Ser. No. 787,148 which is of common inventive entity and which has been filed of even date herewith and allowed Apr. 20, 1987.

DETAILED DESCRIPTION OF THE INVENTION

This invention provides a process for polymerizing ethylene in the presence of selected nickel-containing catalysts, the polyethylene thus produced being substantially linear and crystalline and having a molecular weight of at least 1000. In the process of the invention, ethylene is polymerized in a suitable solvent, under an oxygen-free atmosphere, at a temperature in the range of about 0° C. to about 200° C., preferably about 20° C. to about 120° C., at an ethylene pressure in the range of about 1 psig (6.9 kPa) to about 10,000 psig (6.9×10$^4$ kPa), preferably about 10 psig (69 kPa) to about 3,000 psig (20,700 kPa), in the presence of a selected nickel-containing catalyst.

The nickel-containing catalysts used in the process of this invention consist essentially of one or more of the following:

1(a) The dinickel compound of the formula

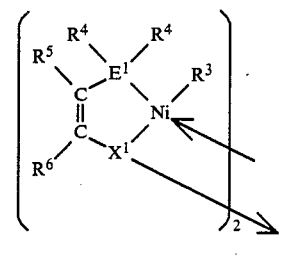

wherein:

$R^3$ and each $R^4$, independently, is H or $C_{1-20}$ hydrocarbyl;

$X^1$ is O or S;

$E^1$ is P, As or Sb; and each of $R^5$ and $R^6$, independently, is H, $C_{1-20}$ hydrocarbyl or a functional group selected from $-OR^2$, $-Cl$, $-CO_2R^2$, $-CO_2M$, $-C(O)N(R^1)_2$, $-C(O)R^2$, $-SR^2$, $-SO_2R^2$, $-SOR^2$, $-OSO_2R^2$, $-P(O)(OR^2)_{2-y}(R^1)_y$, $-CN$, $-NHR^2$, $-N(R^2)_2$, $$-CH\underset{O}{\overset{}{\diagdown\diagup}}CH_2,$$

$-Si(OR^1)_{3-x}(R^1)_x$, $-OSi(OR^1)_{3-x}(R^1)_x$, $-NO_2$, $-SO_3M$, $-PO_3M_2$ and $-P(O)(OR^2)_2M$ wherein M is alkali or alkaline earth metal, ammonium, quaternary ammonium, phosphonium or arsonium, y is 0, 1 or 2, each $R^1$, independently, is H or $C_{1-20}$ hydrocarbyl, each $R^2$, independently, is $C_{1-20}$ hydrocarbyl, and x is 0 or an integer of 1 to 3, or $R^5$ and $R^6$, taken together, is a substituted or unsubstituted $C_{5-8}$ alicyclic, $C_{5-8}$ alicyclic, $C_{5-8}$ heterocyclic or $C_{6-14}$ aromatic ring, the heteroatom of the heterocyclic ring being selected from O, N and S;

1(b) the nickel compound of the formula

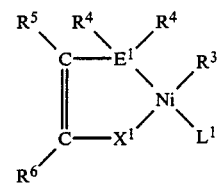

wherein:

$R^3$, $R^4$, $R^5$, $R^6$, $X^1$ and $E^1$ are defined as above and $L^1$ is a weakly coordinating ligand, or $R^3$ and $L^1$ taken together is

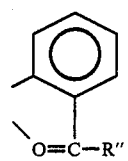

wherein R" is H, $C_{1-20}$ hydrocarbyl or oxyhydrocarbyl or $N(R^2)_2$ wherein each $R^2$, independently, is $C_{1-20}$ hydrocarbyl;

1(c) the nickel-containing compound of the formula

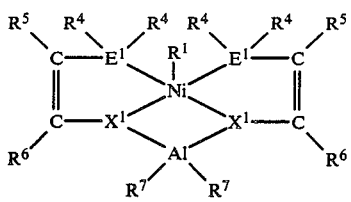

wherein:

$R^1$, $R^4$, $R^5$, $R^6$, $X^1$ and $E^1$ are defined as above; each $R^7$, independently, is H, $-OSi(R''')_3$, $C_{1-20}$ alkyl or oxyalkyl, $C_{6-20}$ aryl, alkaryl, aralkyl or oxyaryl, $N(R^2)_2$ wherein $R^2$ is as defined above, or halogen, or both $R^7$ groups, taken together, is a 5 to 8-membered heterocyclic ring wherein the heteroatom is selected from O, N and S; and each $R'''$, independently, is $C_{1-20}$ alkyl or oxyalkyl, $C_{6-20}$ aryl, alkaryl, aralkyl or oxyaryl;

(2) the mixture comprising:

(i) the nickel compound of the formula

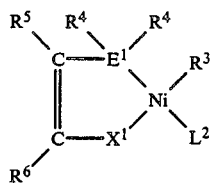

wherein:

$R^3$, $R^4$, $R^5$, $R^6$, $X^1$ and $E^1$ are defined as above and $L^2$ is a strongly coordinating ligand; and (ii) an acceptor compound which can react irreversibly with $L^2$; and (3) the mixture comprising:

(i) the nickel compound of the formula

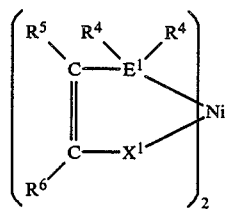

wherein:

$R^4$, $R^5$, $R^6$, $X^1$ and $E^1$ are defined as above; and (ii) a suitable alkylating or arylating compound.

By hydrocarbyl is meant an aliphatic, alicyclic, aromatic or mixed aliphatic-aromatic monovalent radical, optionally containing one or more functional substituents and/or one or more in-chain heteroatoms which are inert under polymerizing conditions.

By "functional substituents" is meant polar radicals which are unreactive under polymerizing conditions. Functional substituents include but are not limited to $-OH$, $OR^2$, $-Cl$, $-CO_2R^2$, $-CO_2M$, $-C(O)N(R^1)_2$, $-C(O)R^2$, $-SR^2$, $-SOR^2$, $-SO_2R^2$, $-OSO_2R^2$, $-P(O)(OR^2)_{2-y}(R^1)_y$, $-CN$, $-NHR^2$, $-N(R^2)_2$,

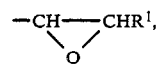

$-CF_3$, $-Si(OR^1)_{3-x}(R^1)_x$, $-OSi(OR^1)_{3-x}(R^1)_x$, $-NO_2$, $-SO_3M$, $-PO_3M_2$, $-P(O)(OR^2)_2M$, $-CO_2Si(OR^1)_{3-x}(R^1)_x$ and $-P(R^1)_2Cr(CO)_5$ wherein M is alkali metal, ammonium or quaternary ammonium and $R^1$, $R^2$, x and y are as defined above.

The term "in-chain" (heteroatom) is intended to include both the main (backbone) chain and any side chain. Preferred in-chain heteroatoms are $-O-$, $-N-$ and $-S-$.

By weakly coordinating ligand ($L^1$) is meant a compound which can bond to nickel, but is readily displaced therefrom by the olefin which is being polymerized. Weakly coordinating ligands ($L^1$) include but are not limited to pyridine, piperidine, alkyl ethers, tetrahydrofuran, alkyl and aryl nitriles and dinitriles, alcohols, amides, aliphatic esters and tertiary amines.

By strongly coordinating ligand ($L^2$) is meant a compound which can bond to nickel sufficiently strongly to displace therefrom part or all of the olefin which is being polymerized. Strongly coordinating ligands ($L^2$) include but are not limited to compounds of the formula $E^1(R^1)_3$ wherein $E^1$ and $R^1$ are defined as above.

By acceptor compound is meant a compound which bonds to (complexes) a ligand more strongly than does nickel. Acceptor compounds include but are not limited to organic oxidants, such as amine oxides, peroxides and hydroperoxides, alkylating compounds and Group VIII metal complexes. Specific examples are trimethylamine oxide, di-t-butylperoxide, cyclohexylhydroperoxide, methyl iodide, trimethylsilyl iodide, bis(benzonitrile)-palladium dichloride, bis(1,5-cyclooctadiene)nickel(O), nickel tetracarbonyl, 2,4-pentanedionatobis(ethylene)rhodium(I) and ethylene pentacarbonylchromium(O).

By alkylating or arylating compound is meant a compound which is capable of chemically transferring alkyl and/or aryl groups, as the case may be, to nickel. Alkylating and arylating compounds include but are not limited to alkyl and aryl iodides, aluminum alkyls and aryls, transition metal alkyl- and aryl-containing compounds, such as dimethyl(1,5-cyclooctadiene)-platinum(II) and dimethylbis(phosphine)nickel, and other conventional reagents capable of transferring alkyl and/or aryl groups.

In catalyst mixture (2), the acceptor compound (2)(ii) is present in the amount of about 0.1 to >1 mole, preferably about 0.5 to about 2 moles, per mole of nickel compound (2)(i).

In catalyst mixture (3), the alkylating or arylating compound (3)(ii) is present in the amount of about 0.01 to about 2 moles, preferably about 0.1 to about 1.5 moles, per mole of nickel compound 3(i).

The catalyst components (i) and (ii) in mixtures (2) and 3 can be introduced to the polymerization reactor together or separately as solids or dispersed or dissolved in a liquid.

Catalyst 1(a) is produced when mixture (2) is subjected to polymerizing conditions in the absence of ethylene and/or comonomer. More specifically, catalyst 1(a) can be prepared by heating mixture (2) in a solvent at a temperature of about 0° C. to about 150° C., preferably about 20° C. to about 60° C., and at any suitable pressure, preferably atmospheric pressure, for about 1 minute to about 48 h. Preferred solvents are aromatic solvents, such as benzene, toluene and xylene. The reaction mixture can be cooled to below room temperature to facilitate precipitation or crystallization of the catalyst 1(a).

Catalyst 1(b) is prepared by contacting and reacting the mixture as described in U.S. Pat. No. 3,686,159 and comprising:

(i) one or more zero valent olefin-nickel compounds or pi-allyl nickel compounds, or a nickel(I) or nickel(II) compound capable of forming said compounds in the presence of a reducing agent; and (ii) the phosphorane of the formula

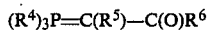

wherein:

$R^4$, $R^5$ and $R^6$ are defined as above, with the proviso that at least one $R^4$ is aryl or substituted aryl, with an excess of the weakly coordinating ligand $L^1$, defined as above. $L^1$ may also serve as a solvent for the reaction. Specifically, said mixture and ligand $L^1$ are mixed in the molar proportion of $\geq 1$ mole of $L^1$ per mole of mixture component (i), preferably about 10 to about 1000 moles of $L^1$ per mole of (i), in a suitable solvent, and reacted at a temperature of about 0° C. to about 150° C., preferably at about 20° C. to about 60° C., for about one minute to about 72 h, at any suitable pressure, preferably atmospheric pressure. Preferably, the nickel compound (i) in the aforesaid mixture is bis(1,5-cyclooctadiene)nickel(O). The catalyst 1(b) is isolated by conventional techniques, such as by filtration or, if dissolved, by precipitation with a non-solvent or by solvent evaporation. Suitable solvents include aromatic compounds, such as benzene or toluene; alcohols, such as ethanol or isopropanol; ethers, such as tetrahydrofuran or diethylether; nitriles, such as acetonitrile or benzonitrile; ketones, such as acetone or methylphenylketone; amides, such as acetamide or dimethylformamide; esters, such as ethyl acetate or methyl benzoate; and dimethylsulfoxide. Aromatic hydrocarbons, such as toluene or benzene, are preferred. Halogen-containing solvents, such as chloroform, methyl iodide or bromobenzene, should be avoided because of possible reaction with the nickel-containing compounds.

It will be understood that catalyst 1(b) is similar in structure to catalyst component 2(i) except that the strongly coordinating ligand $L^2$ is replaced with the weakly coordinating ligand $L^1$.

Catalyst 1(c) is prepared by heating the catalyst mixture (3), wherein the alkylating or arylating agent 3(ii) is an aluminum compound, in a suitable solvent, such as benzene or toluene, at a temperature of about $-25°$ C. to about 120° C., preferably at about 0° C. to about 60° C., for about 1 minute to about 60 minutes. Catalyst 1(c) can be isolated as described above for catalyst 1(b).

The nickel-containing catalyst component 2(i) is a known compound; its preparation is described in U.S. Pat. No. 4,293,502.

The nickel-containing catalyst component 3(i) wherein $X^1$ is O can be prepared:

(a) by the procedure descibed by Moulton and Shaw in J. Chem. Soc. Dalton, 300 (1980);

(b) by reacting the corresponding phosphorane, bis(1,5-cyclooctadiene)nickel, with an approximately 10 to 100 molar excess of methyl methacrylate in an aromatic solvent, such as toluene or benzene, at a temperature of about 20° C. to about 100° C.;

(c) by reacting either catalyst 1(a), catalyst component 2(i) or catalyst 1(b) with a beta-ketophosphine of the formula $(R^4)_2PCH(R^5)C(O)R^6$, wherein $R^4$, $R^5$ and $R^6$ are defined as above, in an aromatic solvent, such as toluene or benzene, at a temperature of about 20° C. to about 120° C., for about 1 minute to about 48 h;

(d) by reacting, in the presence of a strong alkali, such as sodium hydroxide or potassium ethoxide, in a suitable solvent, such as toluene, benzene, tetrahydrofuran (THF) or ether, at a temperature in the range of about $-10°$ C. to about 100° C., the aforesaid beta-ketophosphine and the nickel compound of the formula $(R^8)_2Ni(L^3)_2$ or $(X^2)_pNi(L^3)_m$ wherein:

each $R^8$, independently, is $C_{1-20}$ alkyl or alkoxy or $C_{6-20}$ aryl or aryloxy, preferably methyl, methoxy, phenyl or phenoxy;

each $L^3$, independently, is a monodentate ligand, such as $E^1(R^1)_3$ wherein $R^1$ and $E^1$ are defined as above, or two $L^3$ groups taken together are a bidentate ligand, such as 1,10-phenanthroline, bipyridine or 1,2-bis(dimethylphosphino)ethane or its diphenyl analog;

each $X^2$, independently, is a functional group, such as halogen, CN or $SO_4$;

p is 1 or 2; and m is 0, 1 or 2; or (e) by subjecting any of the catalysts 1(a)–(c), or the catalyst employed by Keim et al., Angew. Chem. Int. Ed. Engl., 17, No. 6, 466 (1978), to ethylene oligomerization or polymerization conditions as described, for example, by Keim et al. in the aforesaid publication. After removing the oligomer by distillation, or the polymer by filtration, the crystalline orange catalyst component 3(i) is recovered by partial evaporation of the solvent at or below atmospheric pressure at a temperature of about 20° C. to about 100° C.

The nickel-containing catalyst component 3(i) wherein $X^1$ is S can be prepared by reacting the compound 3(i) wherein $X^1$ is O with a molar excess of $H_2S$ in an alkanol, such as methanol or ethanol, at a temperature in the range of about $-10°$ C. to about 100° C., preferably about 10° C. to about 40° C., at a pressure of at least one atmosphere; excess $H_2S$ and the alkanol are removed under reduced pressure and the catalyst component can be purified by recrystallization from an alkanol-dichloromethane mixture.

Alternatively, the nickel-containing catalyst component 3(i) can be prepared from a beta-thioketophosphine of the formula $(R^4)_2PCH(R^5)C(S)R^6$ wherein $R^4$, $R^5$ and $R^6$ are defined as above.

Catalysts should be prepared in pure nitrogen or argon. The amount of catalyst employed in the copolymerization process of this invention is not critical and may vary from about 0.001% to about 50%, by weight, based on the combined weights of catalyst, ethylene and comonomer(s) used. Preferably, the amount of catalyst is about 0.001% to about 15%, by weight.

Known poisons for the catalysts used in the invention process include excessive amounts of oxygen, water, inorganic and organic acids, alkyl halide, strongly binding ligands, such as phosphines or arsines, sulfides and aluminum trialkyls (although boron trialkyls are not poisonous). When catalyst poisons are known to be present, scavenger molecules may be added to "neutralize" them. Thus, for example, when water or acids are present, addition of titanium tetraalkoxides, alkyl alumi- numdi(2,6-di-t-butyl-4-methyl)phenoxide or [(1- methoxy-2-methyl-1-propenyl)oxy]trimethylsilane will complex or react with the poisons to give inert products. Also, the scavengers can be heterogeneous; for example, molecular sieves which can bind small molecules such as water and inorganic or organic acids or bases.

The catalysts themselves may be supported on a heterogeneous support, such as the newly-formed polymer, ion exchange resins, inorganic hydroxides or oxides such as alkaline earth oxides or hydroxides or silica, inorganic salts such as nickel(II) chloride, calcium chloride or magnesium chloride, or metal oxides coated with alkaline earth oxides or hydroxides. These supports may immobilize the homogeneous catalysts and thus increase their lifetime.

In the invention process, ethylene is contacted at the reaction temperature with the catalyst as is, in powdered form, or dissolved or dispersed in a polar or non-polar liquid. The catalyst may be added to the reactor either intermittently or continuously. Useful liquids include non-polar organic solvents, such as linear or branched alkanes and cycloalkanes, such as pentane, isooctane and cyclohexane, and mixtures thereof, as well as aromatic solvents, such as benzene, toluene and xylenes. Polar solvents include ethers, such as diethylether, ethylene glycol dimethyl ether, tetrahydrofuran and dioxane; esters, such as ethyl acetate and methyl benzoate; ketones, such as acetone and methylethylketone; amides, such as formamide and dimethyl acetamide; nitriles, such as acetonitrile and benzonitrile; alcohols, such a methanol, isopropanol, tert-butanol and ethylene glycol; amines, such as tri-n-butylamine and N-methylpyrrolidine; sulfur-containing solvents, such as dimethylsulfoxide and sulfolane; fluorocarbons; triethyl phosphate; nitromethane; and tetraethylsilicate.

Additives, such as 2,6-di-tert-butyl-4-methylphenol and its reaction products with trimethylaluminum, as well as titanium(IV) alkoxides, such as titanium(IV) isopropoxide, can also be included in the polymerization reaction mixture. Such additives serve as stabilizers in the final polymer or to scavenge excess water or small amounts of acids which are deleterious to the catalyst.

The polymerization reaction should be carried out in an oxygen-free atmosphere, such as argon, nitrogen, hydrogen, carbon dioxide or sulfur dioxide.

The polymerization is carried out in a temperature range of about 0° C. to about 200° C., preferably about 20° C. to about 120° C. Ethylene pressure may vary from about 1 psig (6.9 kPa) to about 10,000 psig (69,000 kPa), preferably about 10 psig (69 kPa) to about 3,000 psig (20,700 kPa). The polymerization can be carried out in batch, continuous or semi-continuous facilities. The polyethylene can be isolated by conventional techniques, such as filtration, centrifugation, solvent evaporation, or by precipitation in a non-solvent, such as methanol. Optionally, an acid, such as hydrochloric or acetic acid, may be added to the precipitant to help remove spent catalyst from the polymer.

The unreacted monomer and spent catalyst can be removed from the polymer by extraction into a solvent in which the polymer is insoluble. Such solvents include alcohols, ketones and tertiary amines. Spent catalyst can be recovered by crystallization or extraction with water, which may contain small amounts of acid, or by removal of the solvent.

The process of the invention provides polyethylene as the primary product. However, minor amounts of by-product oligomers such as butene, hexene, octene or higher olefins, and copolymers of these olefins with ethylene, may also be produced. Formation of oligomers and copolymers can be eliminated by adjusting process conditions, as exemplfied in Examples 2, 3, 13, 16 and 19.

The polyethylene prepared by the process of this invention will usually have a molecular weight ($\overline{M}_w$) in the range of about 1000 to over 100,000. Said polyethylene is useful in a wide variety of commercial applications, as will be known to those skilled in the art, including, for example, molding resins for producing shaped articles, such as films, membranes and molded objects.

Provided hereinbelow are Experiments 1 to 20 which demonstrate the preparation of catalysts which are useful in the process of the invention. Temperatures are in degrees Celsius.

EXPERIMENT 1

Following is a description of three different preparations of catalyst component 3(i), any one of which, when mixed with a suitable alkylating or arylating agent, forms catalyst mixture (3).

A. To 7.1 g (18.7 mmol) of (benzoylmethylene)-triphenylphosphorane and 2.6 g (9.5 mmol) of bis(cyclooctadiene)nickel(0) was added 300 mL of toluene and 20 g of methyl methacrylate. After stirring the solution for 19 h at 25°, the solvent was removed under reduced pressure and the recovered solid was recrystallized from a mixture of methylene chloride-ethanol by partially removing the methylene chloride under reduced pressure to give 3.8 g of

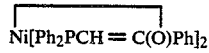

as deep orange crystals. Further reduction of the solvent gave an additional 0.8 g for a combined yield of 75%. The crystals and its solutions are air-stable.

B. Using a procedure substantially the same as that described above, except that the phosphorane used was [benzoyl(phenyl)methylene]triphenylphosphorane, a 30% yield of

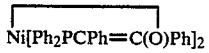

was obtained.

C. A small pressure bottle was charged with 100 mg (0.15 mmol) of

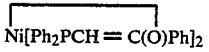

and 10 mL of methanol. After a brief evacuation, the bottle was charged to 80 psig (552 kPa) with hydrogen sulfide. The pressure was released after 5 minutes and the methanol was evaporated. The solid was dissolved in a small amount of methylene chloride; the solution was treated with charcoal and filtered; the charcoal was washed with a small amount of ethanol. On removing part of the solvent 60 mg of honey-colored crystals of

was collected and dried.

EXPERIMENT 2

Catalyst Mixture (3) and Catalyst 1(c)

To 1.10 g (1 68 mmol) of

and 75 mL of toluene was added 0.18 g (2.50 mmol) of trimethylaluminum. After a homogeneous honey-brown solution was obtained, 5 mL of ether and 20 mL of hexane were added. On standing,

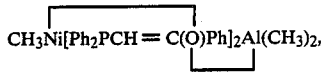

Catalyst 1(c), precipitated as an orange solid which was collected and washed with hexane. The yield was 1.1 g (90%).

EXPERIMENT 3

Catalyst 1(b)

To 3.20 g (8.42 mmol) of (benzoylmethylene)-triphenylphosphorane, 2.31 g (8.42 mmol) of bis(1,5-cyclooctadiene)nickel(0), and 10.8 g of pyridine was added 200 mL of toluene. The mixture was briefly heated to 50°, allowed to cool to 25°, and stirred for 16 h. After the addition of diatomaceous earth filter aid the solution was filtered to remove a small amount of nickel metal. The solvent was removed under reduced pressure. The yellow solid was collected to give, after a hexane wash, 3.8 g of yellow solid

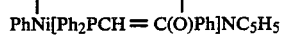

which was purified from warm toluene to which hexane was added.

EXPERIMENT 4

Catalyst 1 (b)

The procedure of Experiment 3 was followed, except that q-picoline was substituted for pyridine and the phorphorane Ph$_2$P=C(SO$_3$Na)C(O)Ph was substituted for (benzoylmethylene)triphenylphosphorane. The product was

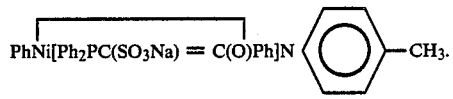

EXPERIMENT 5

Catalyst 1(b)

The procedure of Experiment 3 was followed, except that the phosphorane Ph$_2$P=C(SO$_3$Na)C(O)Ph (4.8 g) was used instead of the (benzoylmethylene)triphenylphosphorane. Yield of

was 4.9 g.

EXPERIMENT 6

Catalyst 1(b)

The procedure of Experiment 3 was followed, except that (benzoylmethylene)(diphenyl)-methylphosphorane (3.3 g) was substituted for (benzoylmethylene)triphenylphosphorane. The product was

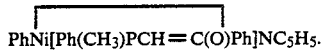

EXPERIMENT 7

Catalyst Mixture (2) and Catalyst 1(a)

A freshly-prepared 70 mL-benzene solution of 2.70 g (4.87 mmol) of Catalyst Component 2(i),

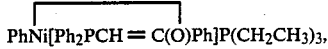

and 0.68 g (2.64 mmol) of acceptor compounds(ethylene)-rhodium(I), was promptly filtered to remove a small amount of insolubles. On standing 0.69 g of honey-brown crystals of

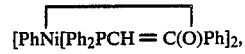

Catalyst 1(a), precipitated; this was collected and washed witn a small amount of benzene. After heating the filtrate to 60° and adding 130 mL of benzene and 50 mL of hexane the solution yielded, after 72 h, an additional 0.25 g of crystals, for a combined yield of 44%.

EXPERIMENTS 8-19

The compounds prepared in these experiments are species of catalyst mixture component (2)(i), of formula hereinabove, wherein L$^2$ is P(R$^1$)$_3$. The compounds of Experiments 8-14 and 17-19 were prepared by procedures similar to those of Keim et al., supra. The compounds of Experiments 15 and 16 were prepared by the procedure described in U.S. Patent 4,293,502. In each case, catalyst mixture (2) was prepared by mixing an acceptor compound, as described above, with the catalyst components prepared in these Experiments 8-19. The symbols represented in the aforesaid formula are tabulated in Table 1.

TABLE 1

| Expt. | R$^3$ | R$^4$ | R$^4$ | R$^5$ | R$^6$ | R$^1$ |
|---|---|---|---|---|---|---|
| 8 | Ph | Ph | Ph | H | Ph | Ph |
| 9 | Ph | Ph | Ph | Ph | OCH$_3$ | CH$_2$CH$_3$ |

TABLE 1-continued

| Expt. | R³ | R⁴ | R⁴ | R⁵ | R⁶ | R¹ |
|---|---|---|---|---|---|---|
| 10 | Ph | Ph | Ph | Ph | Ph | CH₂CH₃ |
| 11 | p-CF₃C₆H₄ | Ph | Ph | H | Ph | CH₂CH₃ |
| 12 | Ph | Ph | Ph | Ph | OCH₃ | Ph |
| 13 | Ph | Ph | Ph | Ph | OCH₃ | CH₃ |
| 14 | Ph | Ph | Ph | Ph | Ph | Ph |
| 15 | Ph | Ph | Ph | SO₃Na | Ph | Ph |
| 16 | Ph | Ph | Ph | SO₃Na | OCH₃ | Ph |
| 17 | Ph | Ph | Ph | H | Ph | p-CF₃C₆H₄ |
| 18 | Ph | o-CH₃OC₆H₄ | Ph | H | Ph | Ph |
| 19 | Ph | o-CH₃OC₆H₄ | * | H | Ph | Ph |

*o-CH₃OC₆H₄
Ph = C₆H₅

EXPERIMENT 20

Catalyst 1(b)

The procedure of Experiment 3 was followed, except that [benzoyl(phenyl)methylene]triphenylphosphorane (5.05 g) was used instead of (benzoylmethylene)triphenylphosphorane. The yield of

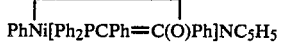

PhNi[Ph₂PCPh=C(O)Ph]NC₅H₅ was 5.3 g.

In the follow example which are embodiments of the invention, parts are by weight and temperatures are in degrees Celsius unless otherwise indicated. All reactions were conducted in an atmosphere of nitrogen

EXAMPLE 1

A 250 mL pressure bottle was charged under nitrogen with 50 mg of the catalyst component prepared in Experiment 8, acceptor compound dichlorobisbenzonitrilepalladium(II), and 50 mL of toluene. A pressure head which was outfitted with a dip tube to remove small amounts of liquid sample for gas chromatographic (G.C.) analyses, an inlet valve for evacuation and charging of gases, for example, ethylene, a gauge and an injection port similar to those found on gas chromatographs were attached. The bottle was briefly evacuated and then charged with 50 psig (345 kPa) of ethylene for 2 minutes. After the valve to the ethylene was closed, the bottle was partially immersed in a 50° oil bath and the solution was magnetically stirred. After the initial pressure rise due to the increase in temperature, the pressure dropped and was kept at 50 psig (345 kPa) for the duration of the run. Samples for G.C. analysis were removed every 30 minutes. After 1 h methyl acrylate (5 mL) was injected. After 4.5 h the pressure was released, the liquid was removed under reduced pressure, and the residue was extracted with methylene chloride to give a small amount of white solid which was identified by its infrared spectrum to be highly crystalline polyethylene containing vinyl end groups. The gas chromatographic analysis showed ethylene oligomers.

A control experiment without the palladium cocatalyst yielded only ethylene oligomers.

EXAMPLES 2-23

A 500 mL pressure bottle was charged under nitrogen with catalyst or catalyst component, acceptor compound or alkylating agent, additive(s) and solvent as shown in Table 2. A pressure head which was outfitted with a valve for evacuation and charging of ethylene or other gases, a gauge, an injection port similar to those found on gas chromatographs, a thermocouple, a mechanical stirrer, and a 75 psig (517.5 kPa) pressure relief valve were attached. The bottle was either briefly evacuated and pressured to 50 psig (345 kPa) with ethylene, or pressured to 60 psig (414 kPa) with ethylene and not evacuated, while the solution was stirred at 500 rpm. The valve was closed after 2 minutes and the bottle was partially immersed in an oil bath which was heated to the constant temperature shown in Table 2. After the initial pressure rise due to the increase in temperature and subsequent pressure drop due to polymerization, the pressure was kept constant at either 50 psig (345 kPa) or 60 psig (414 kPa) by opening the valve to an ethylene supply. The reaction was terminated by releasing the pressure at the times specified in Table 2. A small amount of liquid was removed to test for the presence of oligomers by gas chromatographic analyses.

The content of the bottle was transferred to a 1000 mL beaker with 600 mL of methanol. A small amount of 10 N hydrochloric acid was added and the suspension was stirred until the polymer was white. It was collected on a filter, washed with several portions of methanol and dried at 25° under reduced pressure. The yields are given in Table 2. The last two entries in Table 2 are not of the invention but are included to show the importance of admixing an acceptor compound with a catalyst component; only oligomers were produced in the absence of an acceptor compound.

Examples 15-22, 25, 26 and 37 were run at 50 psig (345 kPa). All other examples in Table 2, together with the last two entries, were run at 60 psig (414 kPa)

TABLE 2

| Ex. | Catalyst or Catalyst Component (Exp't.) | mg | Acceptor or Alkylating Agent$^a$ | mg | Solvent | mL | Oil Bath Temp | Max React Temp | Time (min) | Oligomer | Polyethylene Yield (g) |
|---|---|---|---|---|---|---|---|---|---|---|---|
| 2 | 8 | 100 | Rh | 50 | Ethanol | 50 | 50 | | 120 | None | 0.33 |
| 3 | 8 | 100 | Rh | 100 | Isopropanol | 50 | 50 | | 120 | None | 0.45 |
| 4 | 8 | 100 | Rh | 100 | Acetone | 50 | 50 | | 120 | Traces | 0.69 |
| 5 | 8 | 100 | (CH₃)₃NO | 50 | Isopropanol | 50 | 50 | | 120 | Yes | 0.9 |
| 6 | 8 | 100 | Ni(CO)₄ | 28 | Toluene | 50 | 50 | | 18 h | Yes | 3.5 |

TABLE 2-continued

| Ex. | Catalyst or Catalyst Component (Exp't.) | mg | Acceptor or Alkylating Agent[a] | mg | Solvent | mL | Oil Bath Temp | Max React Temp | Time (min) | Oligomer | Polyethylene Yield (g) |
|---|---|---|---|---|---|---|---|---|---|---|---|
| 7 | 8 | 100 | Ni | 21 | Toluene | 50 | 50 | | 30 | None | 2.3 |
| 8 | 8 | 100 | Rh | 100 | Si(OCH$_2$CH$_3$)$_4$ | 50 | 60 | 70 | 120 | | 0.41 |
| 9 | 9 | 100 | Rh | 60 | Toluene | 100 | 81 | 95 | 18 | | 7.5 |
| 10 | 10 | 100 | Rh | 50 | Toluene | 100 | 50 | | 95 | | 13.6 |
| 11 | 12 | 100 | Ni | 50 | Toluene | 50 | 50 | | 200 | | 8.4 |
| 12 | 13 | 50 | Ni | 50 | Toluene | 50 | 75 | 77 | 15 | | 0.9 |
| 13 | 14 | 200 | Ni | 100 | Toluene | 100 | 60 | 78 | 49 | None | 10.0 |
| 14 | 15 | 100 | Ni | 100 | Toluene | 100 | 25[b] | 68 | 38 | | 13.6 |
| 15 | 15 | 200 | Ni | 98 | Toluene | 100 | 80 | 105 | 180 | | 75.0 |
| 16 | 3 | 200 | None | — | Toluene | 100 | 80 | 104 | 66 | None | 12.2 |
| 17 | 3 | 200 | None | — | Toluene[c] | 100 | 90 | 114 | 42 | Trace | 14.0 |
| 18 | 5 | 200 | None | — | Toluene | 100 | 90 | 114 | 48 | | 14.4 |
| 19 | 5 | 220 | None | — | Toluene[d] | 100 | 81 | 75 | 67 | None | 16.5 |
| 20 | 6 | 200 | None | — | Toluene | 100 | 90 | 118 | 35 | | 13.7 |
| 21 | 7 | 100 | None | — | Toluene | 100 | 75[e] | 78 | 251 | | 59.0 |
| 22 | 1A | 140 | Al(CH$_3$)$_3$ | 38 | Toluene | 50 | 50 | 71 | 120 | Yes | 3.4 |
| 23 | 2 | 100 | None | — | Toluene | 100 | 65 | 66 | 187 | Yes | 3.7 |
| — | 8 | 100 | None | — | Ethanol | 50 | 50 | | 120 | Yes | None |
| — | 15 | 100 | None | — | Toluene | 100 | 25 | 94 | 36 | Yes | None |

[a]Rh is 2,4-pentanedionatobis(ethylene)rhodium(I), Ni is bis(1,5-cyclooctadiene)nickel(O)
[b]Ethylene polymerization commenced immediately
[c]Included 1 g of 2,6-di-tert-butyl-4-methylphenol
[d]Included 205 mg of di(2,6-di-ter-butyl-4-methyl-phenoxymethyl)aluminum
[e]External cooling also used

EXAMPLE 24

Ethylene Polymerization with Catalyst 1(b) and Isolation of the Catalyst Component

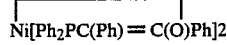

Ni[Ph$_2$PC(Ph)=C(O)Ph]$_2$

Ethylene was polymerized as substantially described in Examples 2–23 using 1.0 g of catalyst, prepared as in Experiment 20, and 200 mL of toluene at 98°. After ethylene uptake ceased, 27 g of polymer was collected. The solvent was removed from the filtrate under reduced pressure. The solid remaining after removal of the solvent was extracted with cold hexane to remove 0.10 g of a wax, leaving 0.45 g of the title catalyst component whose structure was confirmed by its infrared spectrum.

EXAMPLE 25

Ethylene Polymerization with Catalyst Mixture (2)

Under nitrogen, a 1 L autoclave was charged with a 250 mL toluene solution containing 150 mg of bis(cyclooctadiene)nickel(O) and 250 mg of the catalyst component prepared in Experiment 8 and saturated with 500 psig (3450 kPa) of ethylene at 25°. The temperature was raised to 50° and the ethylene pressure was maintained at 500 psig (3450 kPa) for 4 h. After releasing the pressure, 53.0 g of polyethylene was isolated.

EXAMPLE 26

Ethylene Polymerization with Catalyst Representative of U.S. Pat. No. 3,686,159 and With Catalyst 1(b)

A. A glass reactor as described for Examples 2–23 was charged with 225 mg of [benzoyl(phenyl)methylene]triphenylphosphorane, 137 mg of bis(cyclooctadiene)nickel(O) and 200 mL of toluene. After attaching the pressure head, the bottle was partially immersed in a 90° oil bath. After 35 minutes the solution turned black and the temperature was 76°. The bottle was pressured to 60 psi (414 kPa) with ethylene. An immediate exotherm which raised the temperature to 88° occurred. The polymerization temperature was controlled at 83±4° for 45 minutes. After releasing the pressure, 24.8 of grey polymer was precipitated with 500 mL of methanol.

B. A similar run with 290 mg of catalyst 1(b) of Experiment 20 yielded 21.2 g of white polymer.

EXAMPLE 27

Ethylene Polymerization with Catalyst 1(b)

A 1 L, stainless steel, stirred autoclave was charged with 500 mL of dry toluene heated to 50° and saturated with ethylene at 1000 psig (6.9 MPa) pressure. Then, 100 mg of the catalyst prepared as in Experiment 5, dissolved in 30 mL toluene, was injected. The polymerization was controlled at 60° and at 1000 psig (6.9 MPa). After 2 h, 56 g of polymer with an average molecular weight, $\overline{M}_w$, of 363,000 and a molecular weight distribution, MWD, of 25.3 was obtained.

EXAMPLE 28

Ethylene Polymerization with Catalyst Mixture (2)

The procedure of Examples 2–23 was substantiallly followed using 150 mg of the catalyst component prepared as in Experiment 15, 75 mg of bis(cyclooctadiene)nickel(O) and 300 mL of toluene. The polymerization was carried out at 60 psig (414 kPa) ethylene pressure and 26±3° for 20 minutes. The polymer (yield 20.0 g) had an $\overline{M}_w$ of 133,000, an MWD of 10.2 and a density of 0.9620.

EXAMPLE 29

Ethylene Polymerization with Catalyst 1(b)

The procedure of Examples 2–23 was substantially followed using 25 mg of catalyst prepared as in Experiment 20 and 150 mL of toluene. The polymerization was carried out at 60 psig (414 kPa) ethylene pressure and 100±2° for 90 minutes. The polymer (yield 6.0 g) had an $\overline{M}_w$ of 5,100 and an MWD of 2.02.

EXAMPLE 30

A. Supported Catalyst

To 100 mg (0.16 mmol) of the nickel compound of the formula (Ph)(C₅H₅N)Ni[(Ph)₂P-C(SO₃Na)—C(O)Ph] dissolved in 100 mL of toluene was added 5 g of calcium hydroxide powder. The mixture was stirred for 50 minutes. The powdered product was collected by filtration, washed with toluene, and dried.

B. Polymerization of Ethylene

Ethylene was polymerized as described in Examples 2-23 using 5 g of the supported catalyst prepared in Part A at 79° for 59 minutes. The polymer was collected as previously described except that excess hydrochloric acid was used to dissolve the calcium hydroxide. Analysis showed that no oligomers were formed. The polyethylene product (6.1 g) had a $\overline{M}_w$ of 79,900.

What is claimed is:

1. Polymerization process for producing substantially linear and crystalline polyethylene having a molecular weight of at least 1000, said process comprising contacting and reacting ethylene, in an oxygen-free atmosphere, at a temperature in the range of about 0° C. to about 200° C., in the presence of a nickel-containing catalyst selected from:

1(a) The dinickel compound of the formula

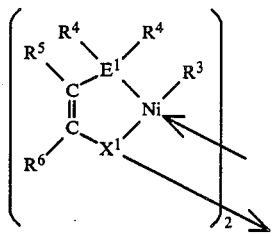

wherein:

$R^3$ and each $R^4$, independently, is H or $C_{1-20}$ hydrocarbyl;

$X^1$ is O or S;

$E^1$ is P, As or Sb; and each of $R^5$ and $R^6$, independently, is H, $C_{1-20}$ hydrocarbyl or a functional group selected from —$OR^2$, —Cl, —$CO_2R^2$, —$CO_2M$, —$C(O)N(R^1)_2$, —$C(O)R^2$, —$SR^2$, —$SO_2R^2$, —$OSO_2R^2$, —$SOR^2$, —$P(O)(OR^2)_{2-y}(R^1)_y$, —CN, —$NHR^2$, —$N(R^2)_2$,

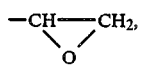

—$Si(OR^1)_{3-x}(R^1)_x$, —$OSi(OR^1)_{3-x}(R^1)_x$, —$NO_2$, —$SO_3M$, —$PO_3M_2$ and —$P(O)(OR^2)_2M$ wherein M is alkali or alkaline earth metal, ammonium, quaternary ammonium, phosphonium or arsonium, y is 0, 1 or 2, each $R^1$, independently, is H or $C_{1-20}$ hydrocarbyl, each $R^2$, independently, is $C_{1-20}$ hydrocarbyl, and x is 0 or an integer of 1 to 3, or $R^5$ and $R^6$, taken together, is a substituted or unsubstituted $C_{5-8}$ alicyclic, $C_{5-8}$ heterocyclic or $C_{6-14}$ aromatic ring, the heteroatom of the heterocyclic ring being selected from O, N and S;

1(B) the nickel compound of the formula

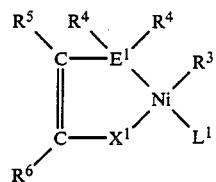

wherein:

$R^3$, $R^4$, $R^5$, $R^6$, $X^1$ and $E^1$ are defined as above and $L^1$ is a weakly coordinating ligand, or $R^3$ and $L^1$ taken together is

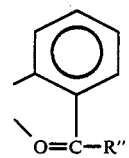

wherein R'' is H, $C_{1-20}$ hydrocarbyl or oxyhydrocarbyl or $n(R^2)_2$ wherein $R^2$ is defined as above:

1(c) the nickel-containing compound of the formula

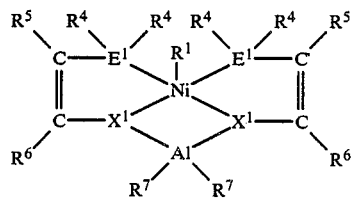

wherein:

$R^1$, $R^4$, $R^5$, $R^6$, $X^1$ and $E^1$ are defined as above;

each $R^7$, independently, is H, —$OSi(R''')_3$, $C_{1-20}$ alkyl or oxyalkyl, $C_{6-20}$ aryl, alkaryl, aralkyl or oxyaryl, $N(R^2)_2$ wherein $R^2$ is as defined above, or halogen, or both $R^7$ groups, taken together, is a 5 to 8-membered heterocyclic ring wherein the heteroatom is selected from O, N and S; and each R''', independently, is $C_{1-20}$ alkyl or oxyalkyl, $C_{6-20}$ aryl, alkaryl, aralkyl or oxyaryl;

(2) the mixture comprising:

(i) the nickel compound of the formula

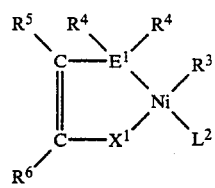

wherein:

$R^3$, $R^4$, $R^5$, $R^6$, $X^1$ and $E^1$ are defined as above and $L^2$ is a strongly coordinating ligand; and (ii) an acceptor compound which can react irreversibly with $L^2$; and (3) the mixture comprising:

(i) the nickel compound of the formula

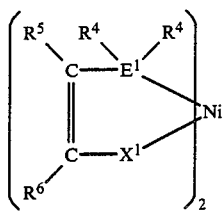

wherein:
$R^4$, $R^5$, $R^6$, $X^1$ and $E^1$ are defined as above; and
(ii) a suitable alkylating or arylating compound.

2. Process of claim 1 wherein the nickel-containing catalyst is supported on a heterogeneous support.

3. Process of claim 1 wherein the temperature is about 20° C. to about 120° C.

4. Process of claim 2 wherein the heterogeneous support is an alkaline earth hydroxide, or silica or metal oxide coated therewith.

5. Process of claim 4 wherein the alkaline earth hydroxide is calcium hydroxide.

6. Process of claim 4 wherein the catalyst is the compound prepared in Experiment 4.

7. Process of claim 4 wherein the catalyst is the compound prepared in Experiment 5.

* * * * *